US009756592B2

(12) United States Patent
Martinez

(10) Patent No.: US 9,756,592 B2
(45) Date of Patent: Sep. 5, 2017

(54) ANTENNA DELAY BUFFERING IN TELECOMMUNICATION RECEIVERS

(71) Applicant: Vincent Pierre Martinez, Castres (FR)

(72) Inventor: Vincent Pierre Martinez, Castres (FR)

(73) Assignee: NXP USA, INC., Austin, TX (US)

( * ) Notice: Subject to any disclaimer, the term of this patent is extended or adjusted under 35 U.S.C. 154(b) by 153 days.

(21) Appl. No.: 14/641,685

(22) Filed: Mar. 9, 2015

(65) Prior Publication Data
US 2016/0105861 A1 Apr. 14, 2016

(51) Int. Cl.
*H04W 56/00* (2009.01)
*H04J 11/00* (2006.01)
*H04W 88/08* (2009.01)

(52) U.S. Cl.
CPC ....... *H04W 56/005* (2013.01); *H04J 11/0063* (2013.01); *H04J 2011/0096* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 5,093,801 A * | 3/1992 | White | ................... | G06F 17/142 708/404 |
| 6,181,258 B1 * | 1/2001 | Summers | ............... | H03D 7/163 340/870.02 |
| 6,393,051 B1 * | 5/2002 | Koizumi | ............. | H04L 27/2608 370/465 |
| 2001/0035841 A1 * | 11/2001 | Porcino | ..................... | G01S 5/14 342/387 |
| 2004/0105512 A1 * | 6/2004 | Priotti | ................... | H04L 1/0618 375/340 |
| 2005/0124344 A1 * | 6/2005 | Laroia | ................... | H04W 36/18 455/436 |
| 2007/0147525 A1 * | 6/2007 | Song | ................... | H04L 27/2647 375/260 |
| 2008/0117962 A1 * | 5/2008 | Kim | ..................... | H04L 1/0052 375/229 |
| 2008/0204217 A1 * | 8/2008 | Costello | ............. | B60C 23/0464 340/447 |
| 2009/0323642 A1 * | 12/2009 | Tanno | .................. | H04B 1/7075 370/336 |

(Continued)

FOREIGN PATENT DOCUMENTS

CN 102571668 A 7/2012
CN 103499823 A 1/2014

*Primary Examiner* — Tejis Daya

(57) ABSTRACT

A telecommunication receiver is arranged for receiving related data originating from multiple antennas, which data have different times of arrival due to, for example, different delays. The receiver comprises an input buffer for buffering data, a transform unit for Fourier transforming the data received from the input buffer into transformed data, and an output buffer for buffering the transformed data received from the transform unit. The input buffer is arranged for passing each set of data items to the transform unit when the relevant data item has been received in the input buffer, while the transform unit is arranged for removing redundant parts of the data. In addition, the output buffer is arranged for synchronizing the transformed data. Thus the buffering for delay compensation is carried out in the output buffer.

19 Claims, 3 Drawing Sheets

(56) References Cited

U.S. PATENT DOCUMENTS

| | | | | |
|---|---|---|---|---|
| 2011/0150149 A1* | 6/2011 | Lee | ................ | H04L 5/0023 |
| | | | | 375/343 |
| 2012/0307743 A1* | 12/2012 | McGowan | ............ | H04L 27/265 |
| | | | | 370/329 |
| 2015/0264683 A1* | 9/2015 | Kim | ................ | H04L 5/0007 |
| | | | | 370/329 |

* cited by examiner

ANTENNA DELAY BUFFERING IN TELECOMMUNICATION RECEIVERS

CROSS REFERENCE TO RELATED APPLICATION(S)

The present application claims priority to International Patent Application No. PCT/IB2014/002471, entitled "ANTENNA DELAY BUFFERING IN TELECOMMUNICATION RECEIVERS," filed on Oct. 8, 2014, the entirety of which is herein incorporated by reference.

FIELD OF THE INVENTION

This invention relates to a telecommunication receiver, a telecommunication system, an integrated circuit, a computer program product, and a method for antenna delay buffering in telecommunication receivers.

BACKGROUND OF THE INVENTION

A telecommunication receiver may receive data signals from more than one source, for example from a plurality of antennas. These sources may have different distances relative to the receiver, resulting in different delay times. That is, as the distances from the sources to the receiver are not the same, the signal delay times corresponding with those distances will also not be the same. As a result of this delay spread, the instances of a signal that arrives at the antennas at approximately the same point in time will typically not arrive at the receiver at the same moment.

In some telecommunication systems, multiple constituent signals are received by multiple antennas and forwarded to a central receiver, which processes the constituent signals to form a single, combined signal. In such systems, the different arrival times of the constituent signals at the receiver necessitate an input buffer to cancel the delay time differences. However, in many applications such an input buffer requires a large amount of memory, in particular when the number of antennas is large and/or when there is a large spread in the distances to the receiver and hence a large delay spread. Especially in the case of one-chip receivers this memory requirement increases the cost of the receiver.

United States Patent Application US2007/147525 discloses a gain control apparatus of an interference cancellation receiver. The known apparatus has an input buffer, an FFT unit and an output buffer. However, this known arrangement is designed to cancel interference and fails to address delay times.

SUMMARY OF THE INVENTION

The present invention provides a telecommunication receiver, a telecommunication system, an integrated circuit, a computer program product, and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

In the following, for sake of understanding, the circuitry is described in operation. However, it will be apparent that the respective elements are arranged to perform the functions being described as performed by them.

Figure 1:
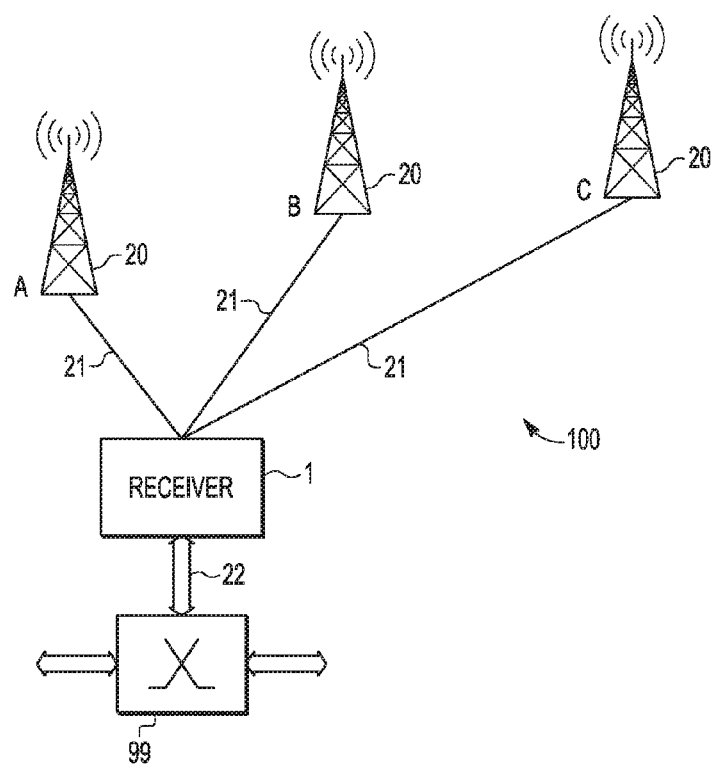
FIG. 1 schematically shows an example of an embodiment of a telecommunication system in which the present invention may be utilized.

An example of a part of a telecommunication network is schematically illustrated in FIG. 1. The network 100 is shown to comprise a telecommunication receiver 1 and a plurality of antennas 20. In the example shown, the antennas 20 are coupled to the receiver 1 by fibre optic cables 21, although in other embodiments, wireless links or conventional copper cables can be used, for example copper cables using DSL (Digital Subscriber Line) techniques. For the sake of clarity, only three antennas 20 are shown, but in practice the number of antennas may be greater than three, but may also be equal to two. The receiver 1 and the antennas 20 may together constitute a cell (or macro cell) of a mobile telecommunication network, such as an LTE (Long Term Evolution) network. In such applications, the receiver 1 is a base station receiver, which is connected with an exchange 99 via a further cable (or wireless) connection 22. Further receivers and their respective antennas (not shown) may be connected to the exchange 99.

The antennas 20 shown in FIG. 1 have locations A, B and C respectively at different distances from the receiver 1, and the fibre optic cables 21 will therefore have different lengths. As a result, signals from the antennas have different delays and will therefore arrive at the receiver at different moments in time. If the distance between the closest and the furthest antenna is 40 km, for example, then the difference in arrival times (that is, the delay spread) will amount to 0.2 ms (at a propagation speed of 200,000 km/s in the optic fibre cable).

In order to accommodate these differences it is known to provide an input buffer where the data contained in the signals from the antennas are temporarily stored until all data have been received. Then the data are processed, for example Fourier transformed. However, the amount of memory necessary to buffer the signals may become inconveniently large. The above-mentioned delay spread of 0.2 ms will, in an LTE network for example, result in an additional buffering requirement of 6144 samples per antenna. This leads to a relatively large increase of the required buffer size.

If a first data item, for example an LTE symbol or LTE sample, present in the input buffer is being processed while a second data item is being received (using the input buffer as a so-called "ping-pong buffer"), then the regular buffer size will be at least two symbols, plus any cyclic prefixes. In the example of LTE, a single symbol may be equal to 2048 samples of four bytes each (at an sampling frequency of 30.72 MHz, for example). Adding cyclic prefixes of 160 and 144 samples respectively, the buffer size may be equal to 2×2048+160+144=4400 samples of 4 bytes each. Assuming 8 antennas having 3 sectors each, the input buffer size should then be 413 KB (kilobyte). When taking the additional 6144 samples required for delay buffering into account, the buffer requirement increases to 10544 samples or 989 KB. In other words, the delay spread cancellation more than doubles the buffer size requirement. This is in particular undesirable when the input buffer is constituted by on-chip memory, as the cost of the chip will be significantly increased by the delay spread compensation.

It is now proposed that the delay spread compensation takes place in the output buffer rather than in the input buffer. To this end, the output buffer is arranged for synchronizing the signals transformed by the transform unit of the receiver, while the input buffer is need not be arranged for delay spread compensation. This will further be explained with reference to FIGS. 2-4.

Figure 2:
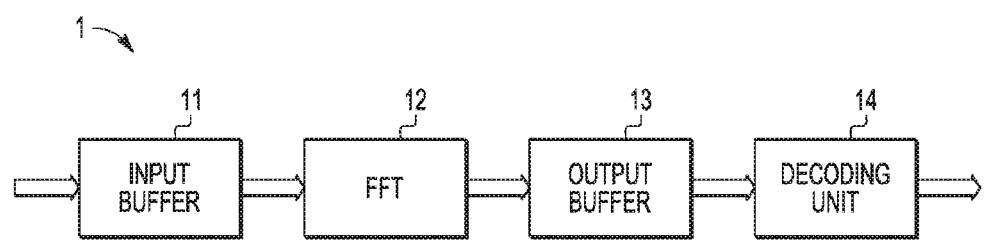
FIG. 2 schematically shows an example of an embodiment of a telecommunication receiver in which the present invention may be utilized.

The example of a telecommunication receiver 1 illustrated in FIG. 2 comprises an input buffer 11, a transform unit 12, an output buffer 13 and a decoding unit 14. In practice, a receiver may comprise more units which are, however, not shown in FIG. 2 for the sake of clarity of the illustration. The decoding unit 14 need not be part of the receiver 1 but may be part of a separate processing unit for further processing the data produced by the receiver.

The input buffer 11 is arranged for buffering data, more in particular data contained in signals received by the antennas 20 and transmitted via the fibre optic cables 21 (or their equivalents) to the receiver 1 (see FIG. 1). An antenna may comprise one or more sectors, for example three sectors, although (much) larger numbers of sectors are also possible. In the example of a embodiment of FIG. 2, the input buffer 11 is a so-called ping-pong buffer, capable of storing, per antenna and optionally also per sector, one set of data items which is being processed by the transform unit 12 and storing, per antenna and optionally per sector, another set of data items which is being received. In the example of FIG. 1, the input buffer 11 therefore may be designed to buffer two data items or sets of data items, which in the case of LTE may each be constituted by one symbols per antenna (or per sector) only, or even a single LTE IQ sample only.

It has been found that it is not necessary to take the delay spread compensation into account when determining the input buffer size. As a result, the input buffer 11 of FIG. 2 is arranged for passing each set of data items to the transform unit 12 when the relevant data item or set of data items has been received in the input buffer. That is, the data are transformed as soon as they are completely contained in the input buffer, and are not buffered until data from another antenna have arrived.

The transform unit 12 is arranged for Fourier transforming the signals received from the input buffer 11 into transformed signals. The transform unit uses an FFT (Fast Fourier Transform), which is well known in the art, to Fourier transform the buffered signals. Alternative embodiments can be envisaged in which the transform unit is arranged for carrying out another transform instead, such as a DCT (Discrete Cosine Transform).

The transform carried out by the transform unit 12 removes any redundant data, such as a cyclic prefix of the symbols. More in particular, the transform unit may be arranged for selecting, from the buffered input data, relevant input data and Fourier transforming the relevant input data into transformed data for each antenna separately (and, if applicable, for each antenna sector separately) as soon as the buffered input data are available. The selecting of relevant input data may involve discarding cyclic prefix data, for example. It is noted that the transform unit 12 may carry out a separate selection step prior to transforming the data in the input buffer. However, in an embodiment the transform unit carries out the selection by only using a subset of the buffered input data while ignoring the remaining data. Accordingly, both the selection and the transform may be carried out as soon as the amount of input data required for the transform is available in the input buffer.

In an embodiment, the input buffer 11 may be arranged for only buffering per antenna the amount of data which corresponds with twice an amount of data that can be submitted to the transform unit for selecting relevant data. That is, when a certain amount of data may be submitted to the transform unit in one batch, the input buffer may be designed to contain only two such batches, one batch being transformed and the other batch being accumulated. In the example of LTE, each batch may consist of a single sample or symbol only, or of multiple samples or symbols.

The transform unit 12 may further be arranged for ignoring or discarding transformed data, such as any guard data. Furthermore, the transform unit may be arranged for selecting data from the transformed data, for example selecting 1200 out of 2048 subcarriers (frequency domain data, that is, transformed data, in an example of a LTE implementation using one LTE carrier of 20 MHz sampled at 30.72 MHz), thus discarding 848 subcarriers and thereby further reducing the amount of data. As a result of one or more of these data selections, the amount of data output by the transform unit will be smaller than the amount of data input into the transform unit, and in some cases significantly smaller: in the above example, the data reduction is approximately 45%.

The output buffer 13 is arranged for buffering the transformed signals received from the transform unit. The output buffer 13 is further arranged for delay spread compensation buffering. That is, the output buffer 13 is arranged for buffering the transformed data for each antenna separately as buffered output data, the output buffer being further arranged for buffering the transformed data until a predetermined amount of transformed data from all antennas is buffered.

In summary, the receiver of FIG. 2 is arranged for receiving, from multiple antennas, related data having different delays and comprises an input buffer 11 for buffering the data for each antenna separately as buffered input data, a transform unit 12 for selecting, from the buffered input data, relevant input data and Fourier transforming the relevant input data into transformed data for each antenna separately as soon as the relevant input data are available, and an output buffer 13 for buffering the transformed data for each antenna separately as buffered output data until a predetermined amount of transformed data from all antennas is buffered.

It is noted that the term "related data" refers to instances of the same data, received at different antennas. Together, these related data constitute a compound set of data. In LTE and other telecommunication standards, the data from different antennas carry different identifications (IDs), allowing the receiver to determine from which antenna a particular data item originates. As the delay of each antenna is typically constant, it will be known beforehand which data will be the last to arrive, that is, which ID identifies the data having the largest delay. The ID identifying the signal having the longest delay allows the output buffer to be flushed, thus achieving delay difference compensation and thereby data synchronization.

The receiver of FIG. 2 further comprises a decoding unit 14 for any desired decoding of the transformed signals, such as PUSCH (Physical Uplink Shared CHannel), PUCCH (Physical Uplink Control CHannel) and/or SRS (Sounding Reference Signal) decoding. Such decoding units are known per se and are not part of the invention.

Figure 3:
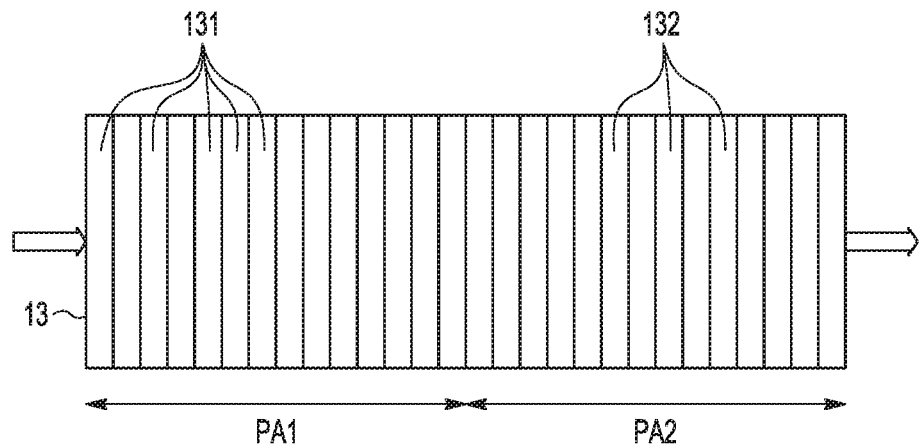
FIG. 3 schematically shows an example of an embodiment of an output buffer for use in the telecommunication receiver of FIG. 2.

The example of a embodiment of an output buffer unit 13 illustrated in FIG. 3 comprises first buffer sections 131 and second buffer sections 132. Each section may be designed to contain one data item only, in the case of LTE this may be one symbol (plus any cyclic prefix and/or other redundant data) only. Using the example of LTE again, the output buffer 13 may comprise 14 first buffer sections for buffering 14 symbols of a first subframe and 14 second buffer sections for buffering 14 symbols of a second subframe. In the example shown, the number of sections is chosen such that a subsequent processing operation (such as carried out by the decoding unit 14 in FIG. 2) has sufficient data to operate. In the example of FIG. 3, the output buffer 13 may contain a first predetermined amount PA1 and a second predetermined amount PA2, each corresponding with one subframe as this is the minimum amount of data required by the decoding unit 14. The predetermined amount PA1, PA2 is therefore defined by the further processing operation carried out after the output buffering and is typically equal to the minimum amount of data necessary to perform the subsequent operation, such as channel equalization and/or decoding. Examples of decoding operations are PUSCH (Physical Uplink Shared Channel) decoding and PUCCH (Physical Uplink Control Channel) decoding in LTE. The predetermined amount of data referred to above may be, for example, only four LTE symbols in the case of channel equalization.

Figure 4:
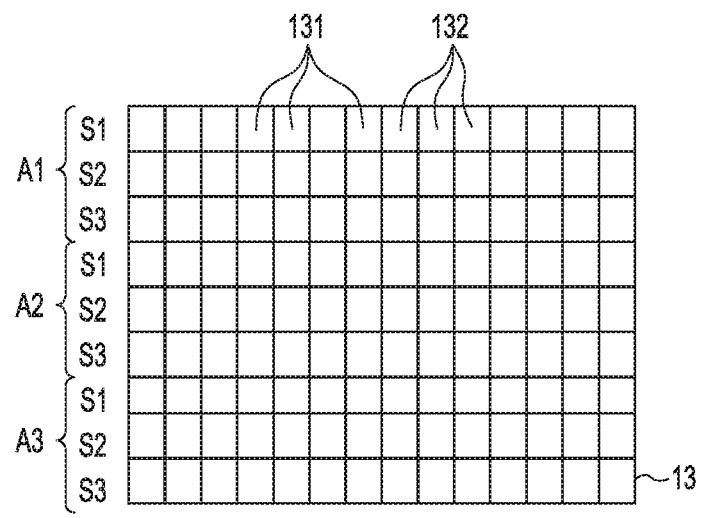
FIG. 4 schematically shows another example of an embodiment of an output buffer for use in the telecommunication receiver of FIG. 2.

For the sake of simplicity, the embodiment of FIG. 3 is shown to buffer the data of only a single antenna or only a single antenna sector. The embodiment of FIG. 4 is shown to be arranged for buffering data from three antennas A1, A2 and A3, each antenna having three sectors S1, S2 and S3. The output buffer 13 of FIG. 4 therefore has nine parallel output buffer parts.

As stated above, the output buffer 13 is filled with transformed data from the transform unit (12 in FIG. 2) as the transformed data become available. Once the transformed data from all antennas have been received, the output buffer is flushed and all transformed signal are forwarded for further processing. Accordingly, the output buffer 13 may carry out a check whether the transformed signals from all antennas and all antenna sectors have been received. More in particular, the output buffer 13 may check whether the predetermined amount of data from each antenna and each antenna section is buffered. As soon as the predetermined amount of data from all antennas and antenna sectors, so also from the antenna or antenna sector having the longest delay, is received, then those data from all antennas and sectors may be forwarded to a further unit for further processing. By forwarding the data simultaneously, any antenna delay differences are cancelled.

In an embodiment, the data are associated with unique identifications, for example an identification of the antenna from which the data originate, thus allowing to buffer the data per antenna (and/or per sector). The identifications may be assigned to the antennas and/or to the connections (21 in FIG. 1) between the antennas and the receiver, and may or may not be contained in the data. The actual data may for example be conveyed in data containers which are set up and identified per antenna. The output buffer 13 may be arranged to compensate any delay differences in the related data by using their identifications.

In an embodiment, the output buffer 13 is arranged to compare the identifications of the buffered transformed signals with a stored list, and to forward the related transformed data when for all identifications of the list the corresponding transformed data are being buffered.

To this end, the antenna having the last time of arrival may be identified beforehand, and the output buffer 13 may be arranged to be flush and therefore forward the related transformed signals TS when the transformed signal originating from said antenna has been received in the output buffer. Accordingly, the identification of the antenna having the longest delay may be used to determine the point in time at which the output buffer is flushed.

It has been found that the required output buffer size may already be present in some applications. In some LTE application, the FFT is "double buffered", that is, the output buffer is organised as a ping-pong buffer, which can contain for example two LTE subframes, one that is being accumulated and one that is being further processed. It can be shown that such a double buffer size is in most applications sufficient for delay difference compensation. For example, when the regular processing time of the data in the output buffer is 0.7 ms, there is a time duration of 0.3 ms available for delay compensation, if we consider a buffer length of 1 ms (double-buffering at LTE subframe level).

Accordingly, in those applications where a double buffer is sufficient for delay difference compensation, there is no need to increase the size of the output buffer. In order to implement the present invention it is sufficient to alter the data processing algorithm of the output buffer.

It is noted that the antenna identification which is present in the data prior to the transform is preferably also present in the transformed data, that is, after the transform. It is noted that the identifications of the original data and the transformed data may be identical. However, embodiments can be envisaged in which the identification of the transformed data is derived from the original identification, for instance by using the same transform. In this respect, it is not essential that the identification of the transformed data is identical to that of the original data, only that it can be derived from the identification of the original data, preferably in a unique manner.

An integrated circuit may comprise at least one telecommunication receiver as described above. A telecommunication system may comprise a plurality of antennas and at least one telecommunication receiver as described above.

A method of receiving from multiple antennas related data having different delays may comprise buffering the data for each antenna separately as buffered input data, selecting, from the buffered input data, relevant data and Fourier transforming the relevant data into transformed data for each antenna separately as soon as the buffered input data are available, and buffering the transformed data for each antenna separately as buffered output data until a predetermined amount of transformed data from all antennas is buffered.

Figure 5:
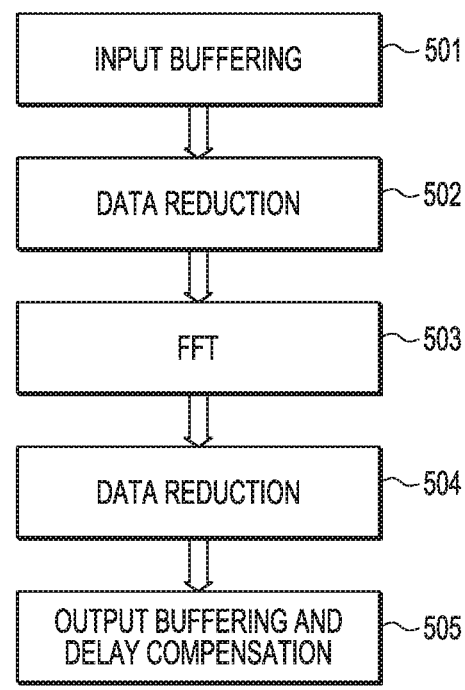
FIG. 5 schematically shows an example of an embodiment of a method as used in the telecommunication receiver of FIG. 2.

This method is schematically illustrated in FIG. 5, where the method starts with an input buffering step 501. The next step 502 is a data reduction step is which cyclic prefixes are discarded while selecting data to be used in the next step, the FFT (Fast Fourier Transform) step 503. After the transform step 503, a further data reduction step 504 may take place in which guard bytes and certain frequency domain components (such as LTE subcarriers) are not selected for output buffering. In the output buffering and delay compensation step 505, the reduced amount of data is compensated for any delay differences.

The invention may accordingly be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

Figure 6:
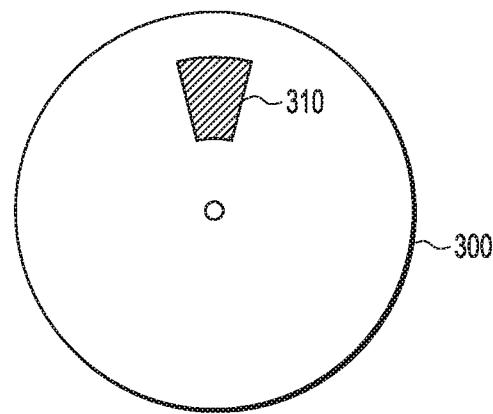
FIG. 6 schematically shows an example of a computer readable medium comprising a computer program product.

The computer program may for example be provided as a non-transitory tangible computer readable storage medium 300, as illustrated in FIG. 6, which may comprise data 310 loadable in a programmable apparatus comprising a receiver as defined above, the loadable data representing instructions executable by the programmable apparatus, said instructions comprising one or more processor instructions for buffering the data for each antenna separately as buffered input data, one or more processor instructions for selecting, from the buffered input data, relevant data and Fourier transforming the relevant data into transformed data for each antenna separately as soon as the buffered input data are available, and one or more processor instructions for buffering the transformed data for each antenna separately as buffered output data until a predetermined amount of transformed data from all antennas is buffered. The data 310 may be embodied on the computer readable medium 300 as physical marks or by means of magnetization of the computer readable medium 300. However, any other suitable embodiment is conceivable as well. Furthermore, it will be appreciated that, although the computer readable medium 300 is shown in FIG. 6 as an optical disc, the computer readable medium 300 may be any suitable computer readable medium, such as a hard disk, solid state memory, flash memory, etc., and may be non-recordable or recordable. The computer readable medium may be a non-transitory tangible computer readable storage medium.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Although the invention has been described above with reference to LTE, the invention is not so limited and can also be applied to telecommunication systems according to other standards, in particular but not exclusively LTE Advanced and its successors. The invention is in particular applicable to OFDM-type communication systems, such as systems based upon OFDM (Orthogonal Frequency Division Multiplexing), OFDMA (Orthogonal Frequency Division Multiple Access), or SC-FDMA (Single Carrier FDMA).

It will therefore be understood by those skilled in the art that the invention is not limited to the embodiments described above and that many modifications and additions can be made without departing from the scope of the invention as defined in the appending claims.

The invention claimed is:

1. A telecommunication receiver for receiving, from multiple antennas, related data having different delays, the receiver comprising:
   an input buffer for buffering the data for each antenna separately as buffered input data, wherein the input buffer is arranged for buffering per antenna the amount of data which corresponds with twice an amount of data that can be submitted to a Fourier transform unit for selecting relevant data,
   the Fourier transform unit for selecting, from the buffered input data, relevant input data and Fourier transforming the relevant input data into transformed data for each antenna separately as soon as the relevant input data are available, and
   an output buffer for buffering the transformed data for each antenna separately as buffered output data until a predetermined amount of transformed data from all antennas is buffered.

2. The telecommunication receiver according to claim 1, wherein the transform unit discards cyclic prefix data and any guard data when selecting the relevant input data.

3. The telecommunication receiver according to claim 1, arranged for identifying the data received from the antennas by using a unique identification for each antenna.

4. The telecommunication receiver according to claim 3, wherein the antenna having the longest delay is identified beforehand, and wherein the output buffer is arranged for buffering the transformed data until a predetermined amount of transformed data from said antenna having the longest delay is buffered.

5. The telecommunication receiver according to claim 1, wherein the predetermined amount of transformed data is a subframe.

6. The telecommunication receiver according to claim 5, further comprising a decoder for decoding the buffered output data.

7. The telecommunication receiver according to claim 5, wherein the further processing comprises channel equalization.

8. The telecommunication receiver according to claim 1, wherein each antenna comprises multiple sectors, and wherein the data are buffered and transformed for each antenna and for sector separately.

9. The telecommunication receiver according claim 1, arranged for use in a base station of a Long Term Evolution telecommunication network.

10. The telecommunication receiver according to claim 1, further comprising at least one decoder.

11. An integrated circuit comprising at least one telecommunication receiver according to claim 1.

12. A telecommunication system, comprising a plurality of antennas and at least one receiver according to claim 1.

13. The telecommunication system according to claim 12, wherein the antennas and the at least one receiver are coupled by optical fibre cables.

14. A method of receiving from multiple antennas related data having different delays, the method comprising:
identifying data received from the antennas by using a unique identification for each antenna, and identifying the antenna having the longest delay is identified beforehand,
buffering the data for each antenna separately as buffered input data the amount of data which corresponds with twice an amount of data that can be submitted to a Fourier transform unit for selecting relevant data,
selecting, from the buffered input data, relevant input data and Fourier transforming, using the Fourier transform unit, the relevant input data into transformed data for each antenna separately as soon as the relevant input data are available, and
buffering the transformed data for each antenna separately as buffered output data until a predetermined amount of transformed data from the antenna having the longest delay is buffered.

15. The method according to claim 14, further comprising selecting, from the transformed data, relevant transformed data and discarding cyclic prefix data and any guard data.

16. The method according to claim 14, wherein the predetermined amount of transformed data is a subframe.

17. The method according to claim 14, wherein each antenna comprises multiple sectors, and wherein the data are buffered and transformed per antenna and per sector.

18. A computer program product comprising instructions stored in a non-transitory machine-readable storage medium for causing a processor system to perform a method of receiving data in a telecommunication receiver, the method comprising:
buffering the data for each antenna separately as buffered input data the amount of data which corresponds with twice an amount of data that can be submitted to a Fourier transform unit for selecting relevant data,
selecting, from the buffered input data, relevant input data and Fourier transforming, using the Fourier transform unit, the relevant input data into transformed data for each antenna separately as soon as the buffered input data are available, and
buffering the transformed data for each antenna separately as buffered output data until a predetermined amount of transformed data from all antennas is buffered.

19. A non-transitory tangible computer readable storage medium comprising data loadable in a programmable apparatus, the loadable data representing instructions executable by the programmable apparatus, said instructions comprising:
one or more processor instructions for buffering data for each antenna of multiple antenna having different delays separately as buffered input data,
one or more processor instructions for identifying the data received from the antennas by using a unique identification for each antenna, and identifying the antenna having the longest delay is identified beforehand,
one or more processor instructions for buffering the data for each antenna separately as buffered input data the amount of data which corresponds with twice an amount of data that can be submitted to a Fourier transform unit for selecting relevant data,
one or more processor instructions for selecting, from the buffered input data, relevant input data and Fourier transforming, using the Fourier transform unit, the relevant input data into transformed data for each antenna separately as soon as the relevant input data are available, and
one or more processor instructions for buffering the transformed data for each antenna separately as buffered output data until a predetermined amount of transformed data from the antenna having the longest delay is buffered.

* * * * *